(12) United States Patent
Takao (10) Patent No.: US 8,231,394 B2
(45) Date of Patent: Jul. 31, 2012

(54) BUTTON DEVICE HAVING A SEPARABLE OPERATION PART AND AN ELECTRONIC DEVICE HAVING SUCH A BUTTON DEVICE

(75) Inventor: Kazuaki Takao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 331 days.

(21) Appl. No.: 12/617,587

(22) Filed: Nov. 12, 2009

(65) Prior Publication Data

US 2010/0136811 A1  Jun. 3, 2010

(30) Foreign Application Priority Data

Nov. 28, 2008  (JP) ................................. 2008-305231

(51) Int. Cl.
*H01R 13/62* (2006.01)
(52) U.S. Cl. ....................................................... 439/159
(58) Field of Classification Search .................. 439/159
See application file for complete search history.

(56) References Cited

U.S. PATENT DOCUMENTS

| | | | |
|---|---|---|---|
| 5,443,395 A * | 8/1995 | Wang | 439/159 |
| 6,000,958 A | 12/1999 | Ishida et al. | |
| 6,174,181 B1 * | 1/2001 | Lai | 439/159 |
| 6,370,608 B2 * | 4/2002 | Yamada et al. | 439/159 |
| 7,484,975 B2 * | 2/2009 | Cheng | 439/159 |

FOREIGN PATENT DOCUMENTS

| | | |
|---|---|---|
| JP | 07-281788 | 10/1995 |
| JP | 2000-311745 A | 7/2000 |
| JP | 2001-143813 A | 5/2001 |
| JP | 3297614 B | 7/2002 |
| TW | M314456 | 6/2007 |
| TW | M327559 | 2/2008 |

OTHER PUBLICATIONS

"Taiwanese Office Action" mailed by Taiwan Patent Office and corresponding to Taiwanese application No. 98131732 on Sep. 26, 2011, with partial English translation and Taiwanese attorney's letter in English explaining the Office Action.

* cited by examiner

*Primary Examiner* — Tho D Ta
(74) *Attorney, Agent, or Firm* — Fujitsu Patent Center (57) ABSTRACT

A button device includes a button operations part; a button base part connected to a mechanism part, the mechanism part being operated by operating the button operations part; and a connecting part configured to connect the button base part and the button operations part to each other at least based on the operation of the button operations part. The connecting part includes a mechanism configured to break connection between the button operations part and the button base part in a case where an external force equal to or greater than strength of the button base part is applied to the button operations part.

7 Claims, 11 Drawing Sheets

BUTTON DEVICE HAVING A SEPARABLE OPERATION PART AND AN ELECTRONIC DEVICE HAVING SUCH A BUTTON DEVICE

CROSS-REFERENCE TO RELATED APPLICATIONS

This patent application is based upon and claims the benefit of priority of Japanese Patent Application No. 2008-305231 filed on Nov. 28, 2008, the entire contents of which are incorporated herein by reference.

FIELD

The embodiments discussed herein are related to button devices and electronic devices.

BACKGROUND

FIG. 1 is a perspective view illustrating a notebook-type personal computer 10. The personal computer 10 includes a main body part 11, a lid part 12, and others. A CPU is provided inside the main body part 11. A keyboard 13, a flat pointer (touch pad) 14, and others are provided on the main body part 11. The lid part 12 is attached to the main body part 11 so as to be opened from and closed against the main body part 11. A liquid crystal display 15 and others are provided attached to the lid part 12.

A card slot 16 is provided in the personal computer 10 so that functions of the personal computer 10 can be expanded. More specifically, an IC card is provided in the card slot 16 so that designated functions of the personal computer 10 can be expanded.

A board (not illustrated in FIG. 1) is provided inside the personal computer 10. A card connector is provided on the board so that the IC card 18 can be attached to or detached from the personal computer 10. The card connector includes a connector and an eject mechanism. The IC card 18 when attached is electrically connected to the connector. The eject mechanism is configured to eject the IC card 18 having been installed and attached.

Next, operations of a general eject mechanism are discussed with reference to FIG. 2. FIG. 2(A) illustrates a partially-inserted state just after the IC card 18 is inserted in the card slot 16. As illustrated in FIG. 2(A), an eject button 17 is moved in a direction indicated by an arrow X1.

Figure 2:
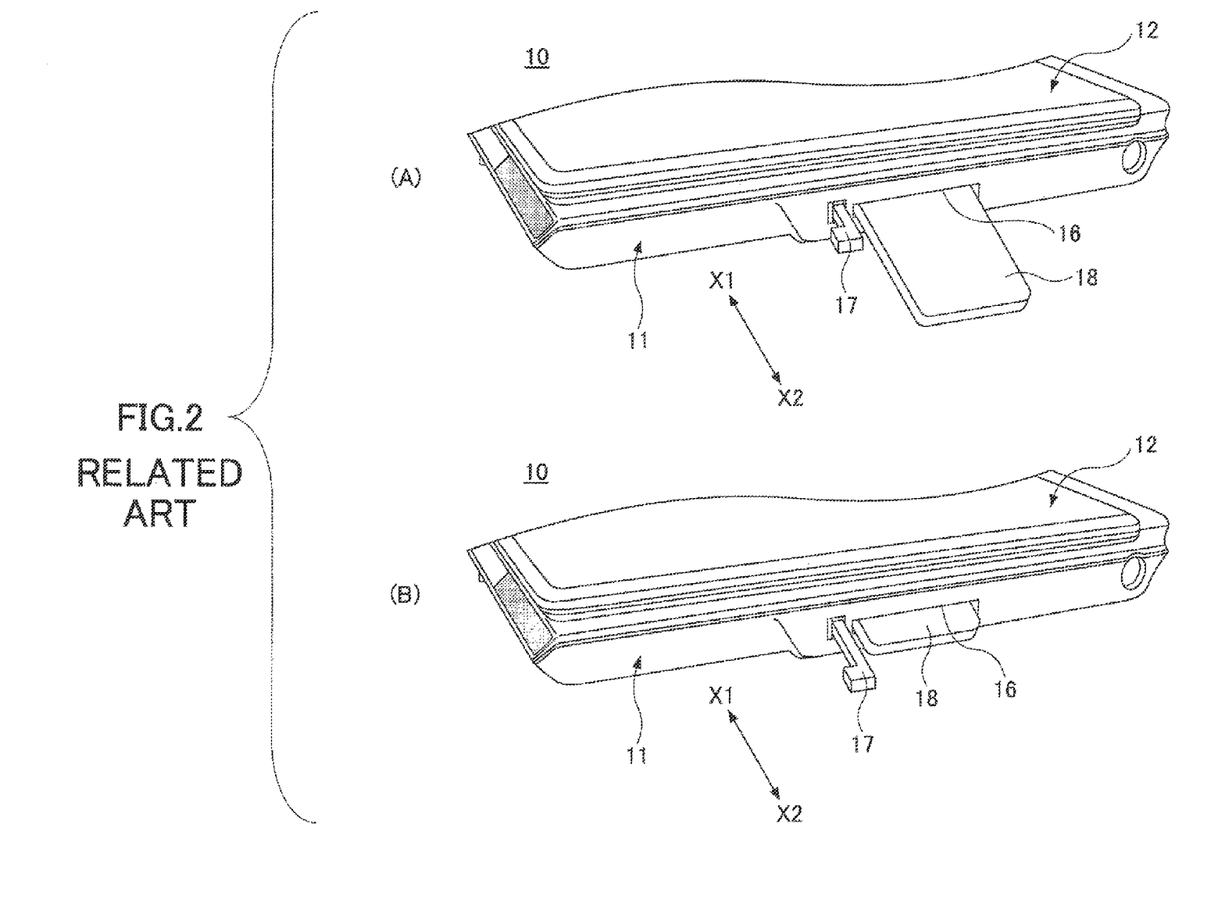
FIG. 2 is a perspective view for explaining an installing operation of the IC card.

When the IC card 18 is inserted further in the X1 direction from the partially-inserted state illustrated in FIG. 2(A), connector terminals formed in the IC card 18 are connected to the connector of the card connector. In addition, when the IC card 18 is installed in a designated position of the card connector, as illustrated in FIG. 2(B), the eject button 17 projects in a direction indicated by an arrow X2.

When the IC card 18 is to be removed (ejected) from the personal computer 10, the projecting eject button 17 is pressed in the direction indicated by the arrow X1 so that the eject mechanism is operated and the IC card 18 is discharged from the card slot 16 in the direction indicated by the arrow X2. See, for example, Japanese Laid-Open Patent Application Publication No. 7-281788.

Figure 3:
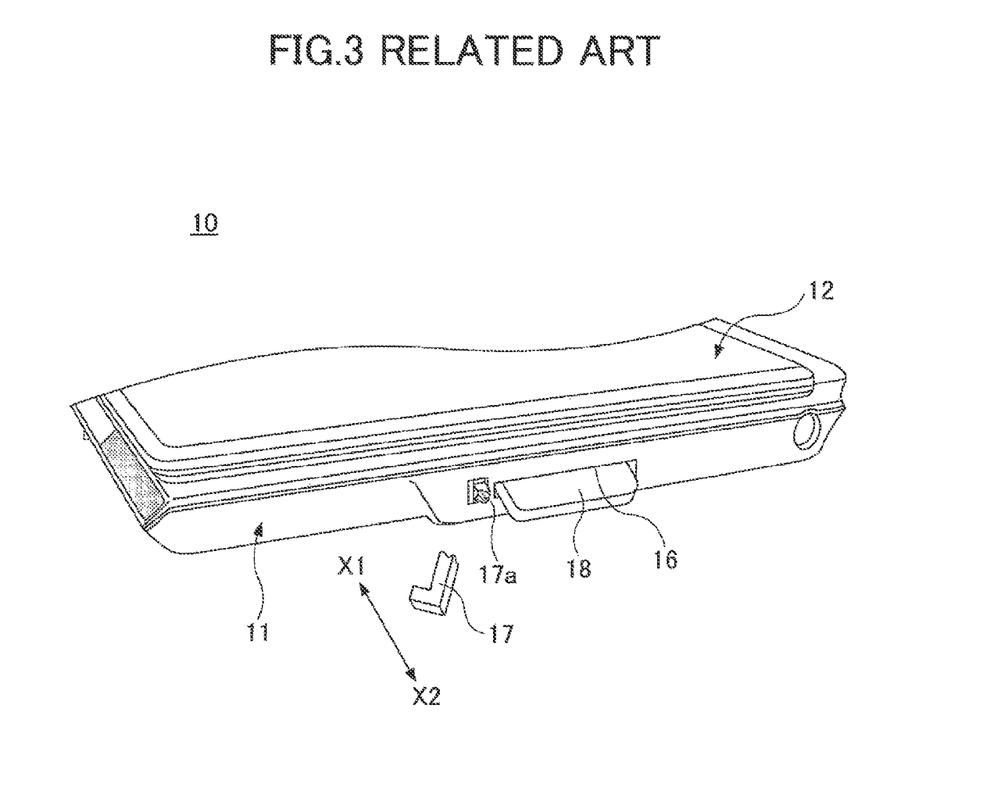
FIG. 3 is a perspective view for explaining problems of the related art.

As discussed above, when the IC card 18 is provided in the personal computer 10, as illustrated in FIG. 2(B), the eject button 17 projects a long distance from a surface of the main body part 11. Accordingly, as an external force is applied to the eject button 17 in this projecting state, as illustrated in FIG. 3, the eject button 17 may be broken so that the IC card 18 may not be ejected (taken out).

Furthermore, when the eject button 17 is broken, it is necessary to disassemble the personal computer 10 and take out the board where the card connector is provided so as to exchange the card connector having the eject button 17. Because of this, repair of the eject button 17 may be extremely troublesome.

As a technique for preventing breakage of the eject button, a structure where the eject button is divided into a button part and a lever part and the button part is configured to be rotated against the lever part has been suggested. See, for example, Japanese Patent No. 3297614.

However, in the technique suggested in Japanese Patent No. 3297614, even in normal use other than when an external force is applied, the button part may be rotated relative to the lever part so that operability may be degraded.

SUMMARY

According to an aspect of the invention, a button device includes a button operations part; a button base part connected to a mechanism part, the mechanism part being operated by operating the button operations part; and a connecting part configured to connect the button base part and the button operations part to each other at least based on the operation of the button operations part; wherein the connecting part includes a mechanism configured to break connection between the button operations part and the button base part in a case where an external force equal to or greater than strength of the button base part is applied to the button operations part.

Additional objects and advantages of the embodiments are set forth in part in the description which follows, and in part will become obvious from the description, or may be learned by practice of the invention. The objects and advantages of the embodiments may be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 1 is a perspective view illustrating a personal computer where an IC card can be installed;

DETAILED DESCRIPTION OF THE PREFERRED EMBODIMENTS

Preferred embodiments of the present invention are explained below with reference to accompanying drawings.

Figure 4:
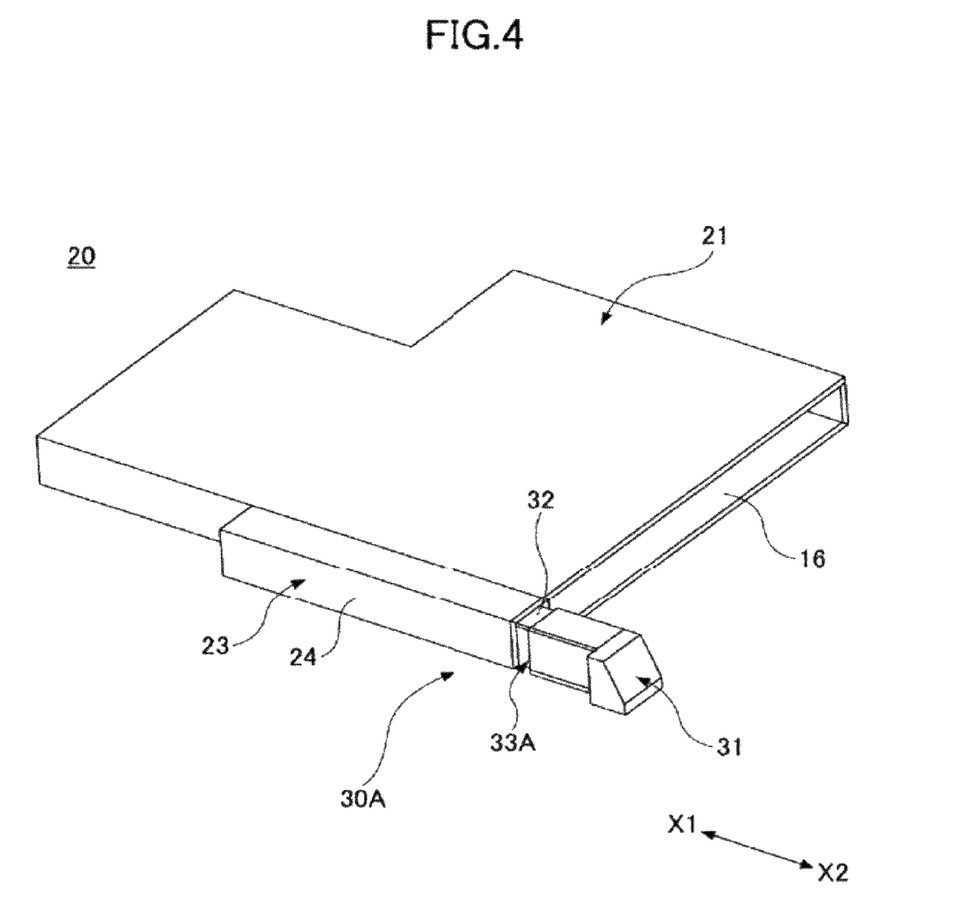
FIG. 4 is a first view illustrating a card connector where a button device of a first embodiment is applied and is a perspective view illustrating where a pushing button part is provided at a button base part.
Figure 5:
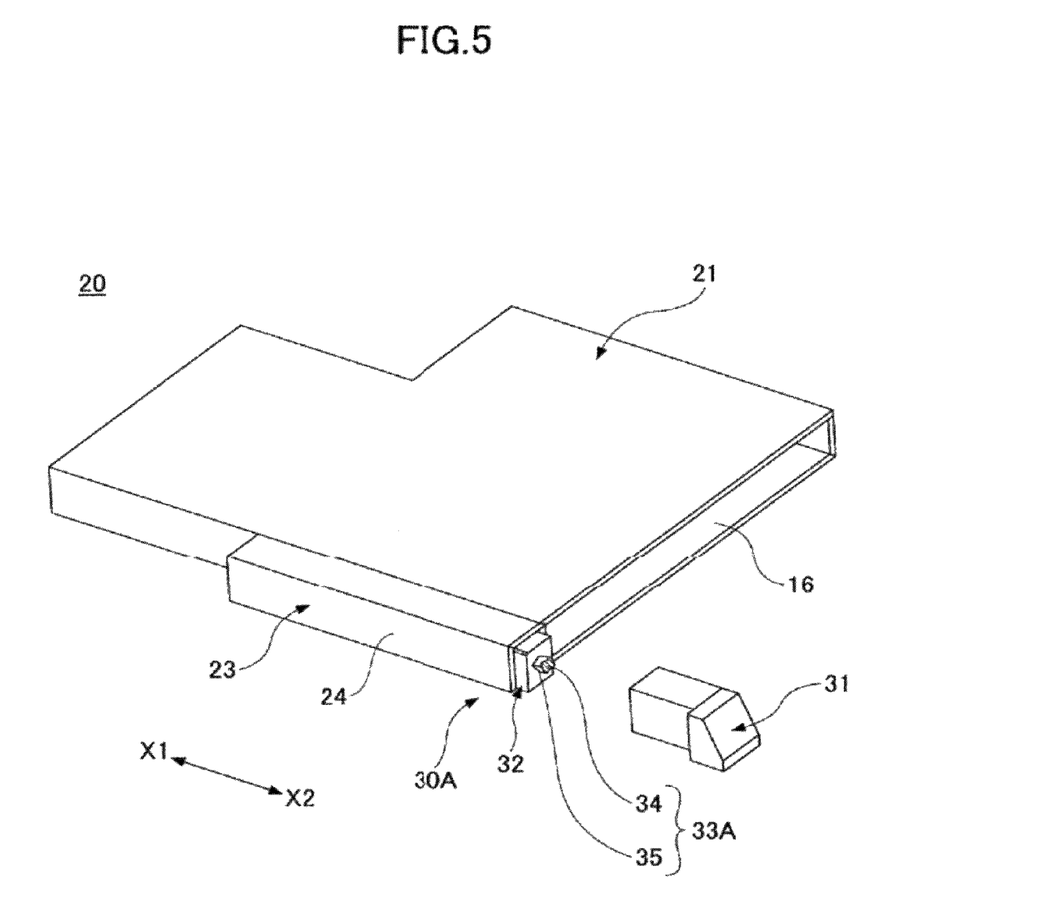
FIG. 5 is a second view illustrating the card connector where the button device of the first embodiment is applied and is a perspective view illustrating where the pushing button part is removed from the button base part.

An electronic device having a button device 30A of a first embodiment is illustrated in FIG. 4 and FIG. 5. The first embodiment is an example where the button device 30A is used as an eject button of a card connector 20 which is an example of an electronic device.

The card connector 20 is configured to attach or detach an IC card 18. The card connector 20 is attached to, for example, the personal computer 10 discussed with reference to FIG. 1. The card connector 20 includes a connector (not illustrated in FIG. 4 and FIG. 5), a connector main body 21, a mechanism part 23, and others.

The connector is provided inside the connector main body 21. When the IC card 18 is attached, the connector is electrically connected to a contact provided on the IC card 18. The connector main body 21 is a housing-shaped member formed of a metal plate. A card slot 16 where the IC card 18 is inserted is formed at an end part of a side indicated by an arrow X2 of the connector main body 21.

A printed wiring board and various electronic components together with the connector are provided inside the connector main body 21. The printed wiring board and various electronic components form an interface for connecting to the IC card 18.

The mechanism part 23 is configured to hold (maintain) the attached state of the inserted and attached IC card 18. The mechanism part 23 is also configured to eject (discharge) the IC card 18 from the connector main body 21 by operating the button device 30A. The mechanism part 23 includes various kinds of arms or springs (not illustrated in FIG. 3 and FIG. 4). The various kinds of arms or springs are provided inside the connector main body 21 or a cover 24.

The button device 30A is connected to the mechanism part 23. The button device 30A, compared to the mechanism part 23, projects in a direction indicated by an arrow X2 and thereby an operator can operate the button device 30A. FIG. 4 is a first view illustrating the card connector 20 before the IC card 18 is attached. At this stage, the button device is moved in a direction indicated by an arrow X1. When the IC card 18 is attached to the card connector 20, the button device 30A is urged (biased) so as to project in the direction indicated by the arrow X2. See FIG. 2(B).

Next, the button device 30A is discussed.

Figure 6:
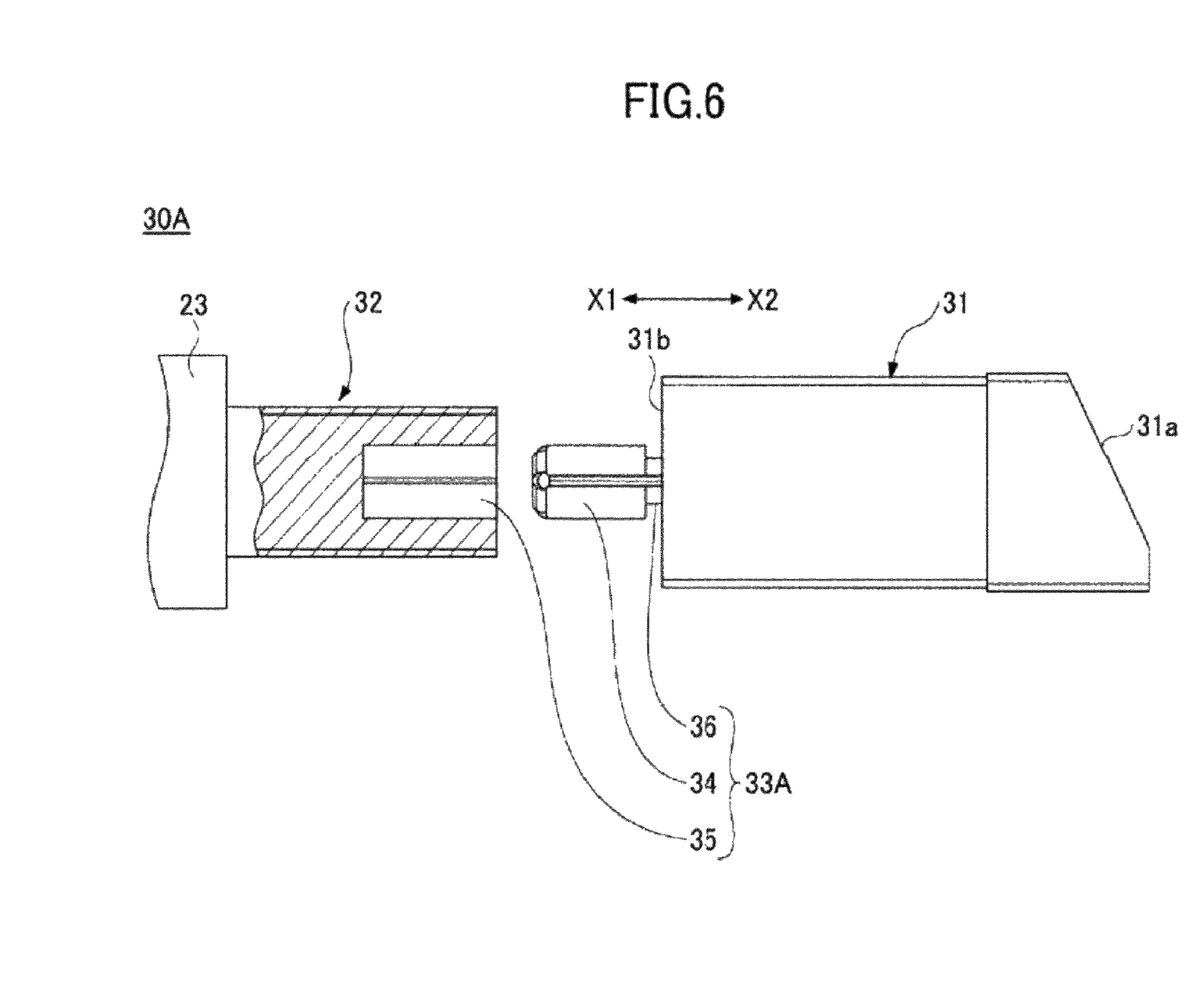
FIG. 6 is an expanded front view illustrating the button device of the first embodiment.

The button device 30A is formed by resin molding. As illustrated in FIG. 6 in an expanded manner, the button device 30A includes a button operations part 31, a button base part 32, a connecting part 33A, and others. The button operations part 31 is pressed by the operator at the time of operation. An operations surface 31a is formed at an end part of a side in the direction indicated by the arrow X2 of the button operations part 31. The operations surface 31a is pressed by the operator.

In addition, a projection part 34 is provided on a side surface 31b opposite to the operations surface 31a of the button operations part 31 so as to project in the direction indicated by the arrow X1. The projection part 34 has a rectangular-shaped cross section. In addition, a fragile part 36 is formed in the vicinity of the side surface 31b of the projection part 34. A cross-sectional area of the fragile part 36 is smaller than that of the projection part 34. The projection part 34 and the fragile part 36 are formed in a body by resin molding.

The mechanical strength of the fragile part 36 is the lowest among parts in the button operations part 31. The strength of the fragile part 36 is lower than that of the button base part 32. However, the strength of the fragile part 36 is set so that the fragile part 36 is not broken at the time of normal button operations.

In this embodiment, the mechanical strength of the fragile part 36 is reduced by making the cross-sectional area of the fragile part 36 smaller than that of the fragile part 36 as discussed above. However, the strength of the fragile part 36 may be reduced by other methods.

The strength of the fragile part 36 may be lowered by, for example, providing a groove, a slit, a piercing hole, a notch, or the like. In addition, while the projection part 34 and the button operations part 31 are formed in a body in this embodiment, the projection part 34 may be connected to the button operations part 31 by an adhesive or the like and the fragile part may be formed by controlling adhesive strength of the adhesive.

On the other hand, the button base part 32 is a stick-shaped member formed by resin molding. One end (an end part in the direction indicated by the arrow X1) of the button base part 32 is connected to the mechanism part 23 discussed above. Furthermore, an installing hole 35 is formed at another end (an end part in the direction indicated by the arrow X2) of the button base part 32. The installing hole 35 has a rectangular-shaped cross section corresponding to that of the projection part 34 of the button operations part 31.

The button operations part 31 is connected to the button base part 32 by pressing the projection part 34 into the inserting hole 35. In this embodiment, the above-mentioned projection part 34, the installing hole 35, and the fragile part 36 function as a connecting part 33A configured to connect the button operations part 31 and the button base part 32 to each other. Accordingly, the button operations part 31 and the button base part 32 are connected to each other via the connecting part 33A.

The button device 30A having the above-discussed structure functions as an eject button configured to eject the IC card 18 from the card connector 20. In other words, when the IC card 18 is inserted and installed in the connector main body 21, the button device 30A projects from the mechanism part 23 in the direction indicated by the arrow X2. Furthermore, when the operations surface 31a of the button operations part 31 is pressed, the pressing force is transmitted to the mechanism part 23 via the button base part 32. As a result of this, the mechanism part 23 is operated, so that the IC card 18 is ejected (discharged) from the card connector 20.

In the meantime, when the IC card 18 is inserted and installed in the connector main body 21, the button operations part 31 of the button device 30A projects from the mechanism part 23 in the direction indicated by the arrow X2. This is called a button projecting state. In this button projecting state, the button operations part 31 of the button device 30A projects a long distance from the mechanism part 23. For example, in a case where the card connector 20 is applied to the personal computer 10 illustrated in FIG. 1, the button operations part 31 of the button device 30A projects from the main body part 11.

Thus, in the case where the button device 30A (especially, the button operations part 31) projects a long distance from the mechanism part 23, an external force is likely to be applied to the button operations part 31. For example, when the card connector 20 is applied to the personal computer 10 illustrated in FIG. 1 and the personal computer 10 is taken into a bar or the like with the IC card 18 installed in the personal computer 10, an external force may be easily applied to the projecting button device 30A.

In the eject button 17 of the related art having the structure where the button operations part and the button base part are formed in a body, when an external force is applied so that the eject button 17 is broken (see FIG. 3), it is necessary to exchange the entire eject button 17. The maintenance operation for the exchange is troublesome as discussed above.

On the other hand, in the button device 30A of this embodiment, the button operations part 31 is connected to the button base part 32 via the connecting part 33A. In addition, the fragile part 36 having the strength lower than those of other portions is formed in the connecting part 33A.

Accordingly, when an external force (hereinafter "external force beyond assumption") which is higher than a force expected at the time of normal button operations and which is higher than the strength of the button base part 32, is applied to the button device 30A of this embodiment, the fragile part 36 is broken earlier than other portions forming the button device 30A. As a result of this, the button operations part 31 is removed (separated) from the button base part 32, so that connection between the button operations part 31 and the button base part 32 is broken.

FIG. 5 shows where the button operations part 31 is removed from the button base part 32 due to application of the external force beyond assumption so that the connection between the button operations part 31 and the button base part 32 is broken.

Thus, in the button device 30A of this embodiment, when the external force beyond assumption is applied, the fragile part 36 provided on the button operations part 31 is broken and the button base part 32 is maintained without being broken. Because of this, the button device 30A can be repaired by exchanging only the button operations part 31. Hence, it is possible to achieve a decrease in the number of steps required for the maintenance and reduction of costs.

Furthermore, in the button device 30A of this embodiment, by making the button base part 32 and the connecting part 33A common, it is possible to vary the configuration and design of the button operations part 31. As a result of this, it is possible to reduce the time period for developing products in terms of making a design.

Next, a second embodiment is discussed.

Figure 7A:
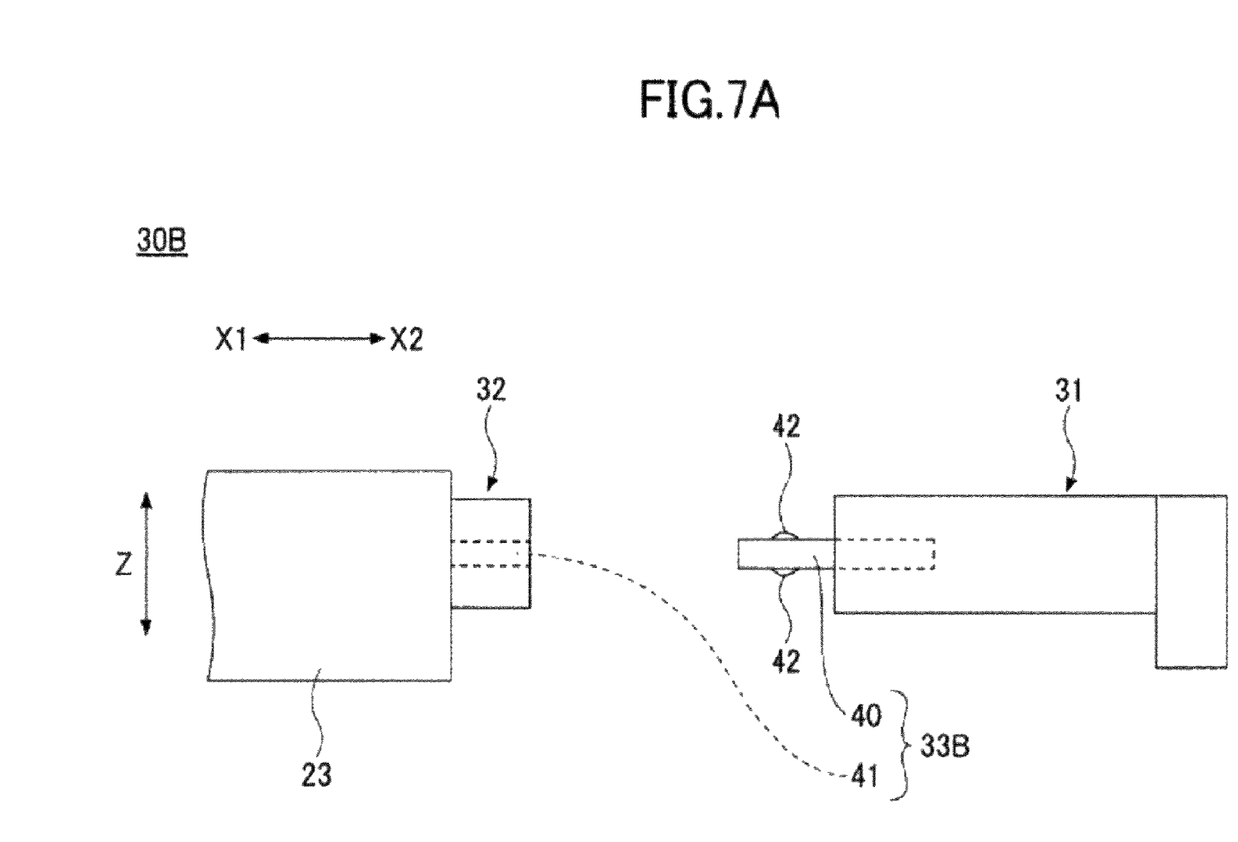
FIG. 7A is a front view illustrating where a pushing button part is removed from a button base part in a button device of a second embodiment.
Figure 7B:
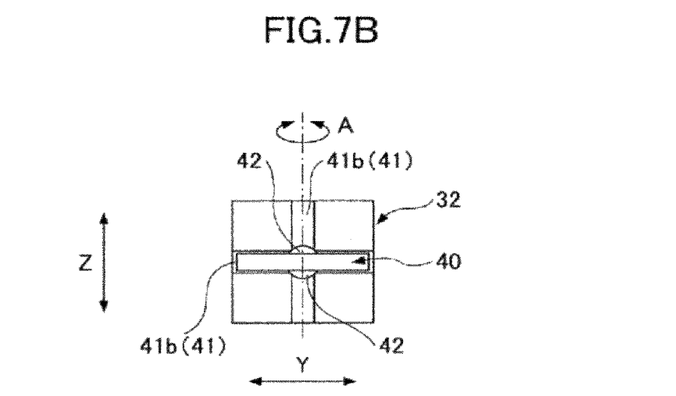
FIG. 7B is a right side view of the button base part in the button device of the second embodiment.
Figure 7C:
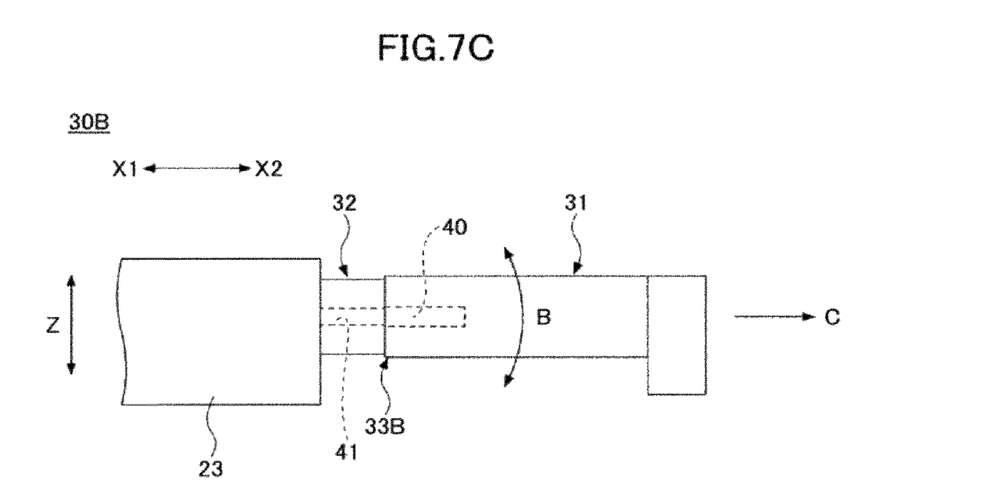
FIG. 7C is a front view illustrating where the pushing button part is provided at the button base part in the button device of the second embodiment.

FIG. 7A through FIG. 7C show a button device 30B of the second embodiment. In FIG. 7A through FIG. 7C, parts that are the same as the parts shown in FIG. 1 through FIG. 6 are given the same reference numerals, and explanation thereof is omitted. Since the button device 30A of the first embodiment is provided at the card connector 20 illustrated in FIG. 4, an illustration of the card connector 20 is omitted in FIG. 7A through FIG. 7C.

As illustrated in FIG. 7A, the button device 30B of the second embodiment includes the button operations part 31, the button base part 32, and a connection part 33B. The connection part 33B includes a metal plate 40 and a cross-shaped groove 41.

The metal plate 40 is a strip metal plate. The metal plate 40 is made of a material having corrosion resistance such as aluminum, a copper alloy, or an iron alloy that is plastically deformable. A certain area of the metal plate 40 including an end part in a direction indicated by the arrow X2 is embedded in the button operations part 31 made of resin, so that the metal plate 40 is fixed to the button operations part 31. As a method of attaching the metal plate 40 to the button operations part 31, various methods such as insert molding, press fitting, fixing by an adhesive, and others can be used.

In addition, convex parts 42 are formed near an end part of the metal plate 40 in the direction indicated by the arrow X1 opposite to the end part fixed in the button operations part 31. The convex part 42 is a hemispherical-shaped projection having a diameter of approximately 2 mm. The convex parts 42 are formed at the same time as press forming of the metal plate 40. In this embodiment, the convex parts 42 are formed on opposing surfaces of the metal plate 40 one by one. The convex parts 42 are formed in center positions in a width direction of the opposing surfaces of the metal plate 40.

On the other hand, the cross-shaped groove 41 is formed in the button base part 32. The button base part 32 is a resin molded article. The cross-shaped groove 41 is formed at the same time that the button base part 32 is formed by resin molding. FIG. 7B is a right side view of the button base part 32. FIG. 7B schematically shows where the metal plate 40 is engaged with the cross-shaped groove 41. As illustrated in FIG. 7B, the cross-shaped groove 41 includes a Y direction groove 41a extending in a Y direction and a Z direction groove 41b extending in a Z direction. The Y direction groove 41a and the Z direction groove 41b are orthogonal in the substantially center position of the button base part 32 seen from the right side.

The width of the Y direction groove 41a is slightly less than the thickness of the metal plate 40. The width of the Z direction groove 41b is slightly less than the diameter of the convex parts 42. In addition, since the button base part 32 is formed by resin molding and the cross-shaped groove 41 is formed in the button base part 32, the vicinity of the cross-shaped groove 41 in the button base part 32 can be elastically deformed.

In the button device 30B having the above-discussed structure, the metal plate 40 forming the connecting part 33B is engaged with the cross-shaped groove 41 so that the button operations part 31 and the button base part 32 are connected to each other. As discussed above, the width of the Y direction groove 41a is slightly less than the thickness of the metal plate 40. Therefore, the metal plate 40 is press-fitted into the Y direction groove 41a. Furthermore, the width of the Z direction groove 41b is slightly less than the diameter of the convex parts 42. Therefore, the button operations part 31 is securely connected to the button base part 32. FIG. 7C shows the button operations part 31 connected to the button base part 32.

Next, an operation in a case where the external force beyond assumption is applied at the time of the button projection state of the button device 30B of this embodiment is discussed.

In the button device 30B of this embodiment, the metal plate 40 fixed to the button operations part 31 is engaged with the cross-shaped part 41 formed in the button base part 32. The engaging force is set so that the button base part 32 is not deformed against the button operations part 31 at a normal button operations time.

However, when the external force beyond assumption is applied, the connecting part 33B is operated as follows. The external force beyond assumption is applied mainly in three directions, that is, a rotational direction as indicated by an arrow A in FIG. 7B with respect to an engaging position of the convex part 42 and the Z direction groove 41b, a bending direction of the metal plate 40 as indicated by an arrow B in FIG. 7C with respect to the engaging position of the metal plate 40 and the cross-shaped groove 14, and an axial direction indicated by an arrow C in FIG. 7C where the button operations part 31 is pulled from the button base part 32.

First, a case where the external force beyond assumption is applied in the direction indicated by the arrow A is assumed. In this case, the metal plate 40 is rotated in the direction indicated by the arrow A with respect to the engaging position of the convex part 42 and the Z direction groove 41b. As a result of this, the button operations part 31 is shifted against the button base part 32 from a standard position (position where the button operations part 31 and the button base part 32 are coaxially arranged in a line). In this case, it is not possible to perform the pressing operations on the button base part 32 by the button operations part 31. Accordingly, the connection between the button operations part 31 and the button base part 32 is substantially broken at the connection part 33B.

When the external force beyond assumption is equal to or greater than the force for engaging the Z direction groove 41b with the convex parts 42, the metal plate 40 is removed from the cross-shaped groove 41. Accordingly, in this case, the connection between the button operations part 31 and the button base part 32 at the connection part 33B is completely broken. At this time, the metal plate 40 is moved substantially horizontally perpendicular to the extending direction of the Y direction groove 41a. In addition, the cross-shaped groove 41 is formed in the bottom base part 32 so that the bottom base part 32 can be elastically deformed. Hence, when the metal plate 40 is removed from the cross-shaped groove 41, the button base part 32 is not broken.

In a case where the external force beyond assumption is applied in the direction indicated by the arrow B, the metal plate 40 is plastically deformed in the direction indicated by the arrow B. Thus, even in the case where the metal plate 40 is plastically deformed, the button operations part 31 is shifted against the button base part 32 so that the connection between the button operations part 31 and the button base part 32 is substantially broken.

In a case where a stronger external force beyond assumption is applied, the metal plate 40 is removed from the button base part 32. Accordingly, the connection between the button operations part 31 and the button base part 32 at the connection part 33B is completely broken. However, as discussed above, the cross-shaped groove 41 is formed in the bottom base part 32 so that the bottom base part 32 can be elastically deformed. Hence, when the metal plate 40 is removed from the cross-shaped groove 41, the button base part 32 is not broken.

In addition, when the external force beyond assumption is applied in the direction indicated by the arrow C, the metal plate 40 is removed from the button base part 32 so that the connection between the button operations part 31 and the button base part 32 at the connection part 33B is completely broken. In this case, when the metal plate 40 is removed from the cross-shaped groove 41, the button base part 32 is not damaged.

Thus, in the button device 30B of this embodiment, when the connection between the button operations part 31 and the button base part 32 is broken at the connection part 33B, the button base part 32 is prevented from being broken by rotation of the metal plate 40 in the cross-shaped groove 41, the plastic deformation of the metal plate 40, the elastic deformation of the button base part 32 where the cross-shaped groove 41 is formed, or the like. Because of this, even if the external force beyond assumption is applied, the button device 30B can be repaired by exchanging only the button operations part 31. Hence, it is possible to decrease the number of steps required for maintenance and reduce the cost.

Next, a third embodiment is discussed.

Figure 8A:
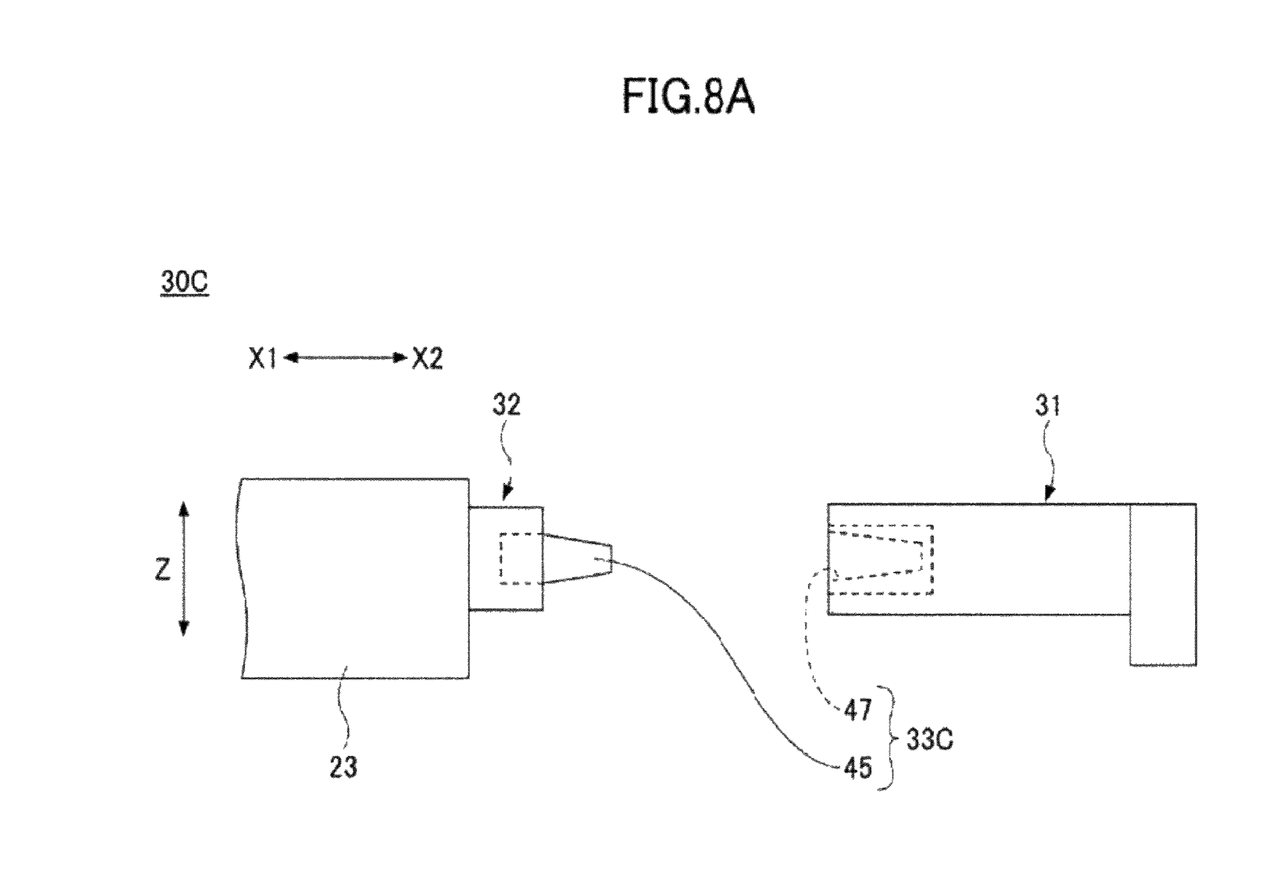
FIG. 8A is a front view illustrating where a pushing button part is removed from a button base part in a button device of a third embodiment.
Figure 8B:
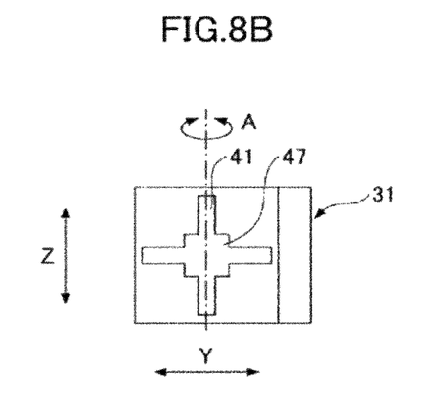
FIG. 8B is a right side view of the button base part in the button device of the third embodiment.
Figure 8C:
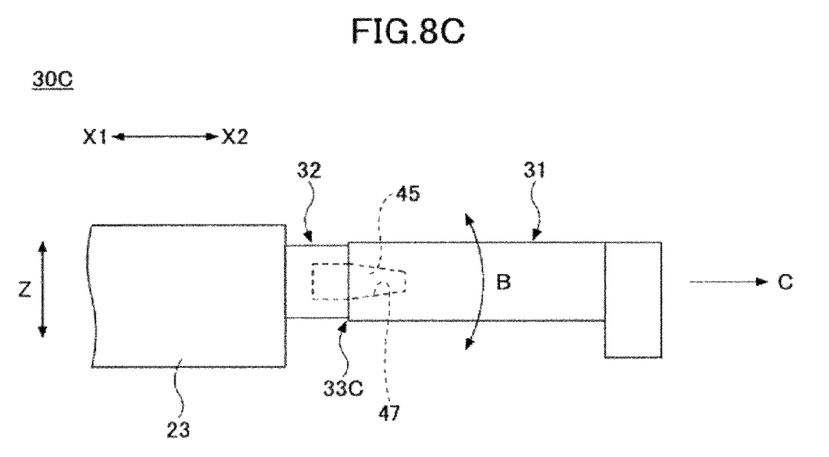
FIG. 8C is a front view illustrating where the pushing button part is provided at the button base part in the button device of the third embodiment.

FIG. 8A through FIG. 8C show a button device 30C of the third embodiment. In FIG. 8A through FIG. 8C, parts that are the same as the parts shown in FIG. 1 through FIG. 6 are given the same reference numerals, and explanation thereof is omitted. Since the button device 30A of the first embodiment is provided at the card connector 20 illustrated in FIG. 4, an illustration of the card connector 20 is omitted in FIG. 8A through FIG. 8C.

As illustrated in FIG. 8A, the button device 30C of the third embodiment includes the button operations part 31, the button base part 32, and a connection part 33C. The connection part 33C includes a metal pillar 45 and a quadrangular pyramid groove 47.

The metal pillar 45 has a quadrangular pyramid-shaped configuration where a cross-section becomes smaller as its position is moved in the direction indicated by the arrow X2. The metal pillar 45 is made of material having mechanical strength higher than that of the button operations part 31 such as a metal material (for example, stainless, aluminum die-cast, or the like), hard plastic, or the like.

A certain area of the metal pillar 45 from an end part in a direction indicated by the arrow X1 is embedded in the button base part 32, so that the metal pillar 45 is fixed to the button base part 32. As a method of providing the metal pillar 45 embedded in the button base part 32, various methods such as insert molding, press fitting, fixing by an adhesive, and others can be used.

On the other hand, the quadrangular pyramid groove 47 is formed in the button operations part 31. The button operations part 31 is a resin molded article. The quadrangular pyramid groove 47 is formed at the same time that the button operations part 31 is formed by resin molding. FIG. 8B is a left side surface view of the button operations part 31. As illustrated in FIG. 8B, the cross-shaped groove 41 is formed in the button operations part 31. The quadrangular pyramid groove 47 is formed in the center of the cross-shaped groove 41. Since the quadrangular pyramid groove 47 is formed in the cross-shaped groove 41, the vicinity of the position in the button operations part 31 where the quadrangular pyramid groove 47 is formed can be elastically deformed.

In the button device 30C having the above-mentioned structure, the metal pillar 45 forming the connecting part 33C is engaged with the quadrangular pyramid groove 47, so that the button operations part 31 is connected to the button base part 32. The internal configuration of the quadrangular pyramid groove 47 is slightly smaller than the external configuration of the metal pillar 45. Accordingly, the metal pillar 45 can be press fitted into the quadrangular pyramid groove 47. FIG. 8C illustrates the button operations part 31 connected to the button base part 32.

Next, an operation in a case where the external force beyond assumption is applied at the time of the button projection state of the button device 30C of this embodiment is discussed.

In the button device 30C of this embodiment, the metal pillar 45 fixed to the button base part 32 is engaged with the quadrangular pyramid groove 47 formed in the button operations part 31. The engaging force is set so that the button base part 32 is not deformed against the button operations part 31 at a normal button operation time.

In a case where the external force beyond assumption is applied, even in a case where the direction in which the external force beyond assumption is applied is any of the directions indicated by the arrows A through C, the metal pillar 45 is removed from the quadrangular pyramid groove 47 so that the connection between the button operations part 31 and the button base part 32 is broken. At this time, the vicinity of the position in the button operations part 31 where the quadrangular pyramid groove 47 is formed may be elastically deformed. When the external force beyond assumption is large, a part of the button operations part 31 may be broken.

However, the metal pillar 45 is made of a material having mechanical strength higher than the material of the button operations part 31. In addition, the metal pillar 45 is fixed to the button base part 32. Accordingly, when the metal pillar 45 is removed from the quadrangular pyramid groove 47, the button base part 32 including the metal pillar 45 is not broken. Because of this, even if the external force beyond assumption is applied so that the connection between the button base part 32 and the button operations part 31 is broken, the button device 30C can be repaired by exchanging only the button operations part 31. Hence, it is possible to decrease the number of steps required for maintenance and reduce the cost.

Next, a fourth embodiment is discussed.

Figure 9A:
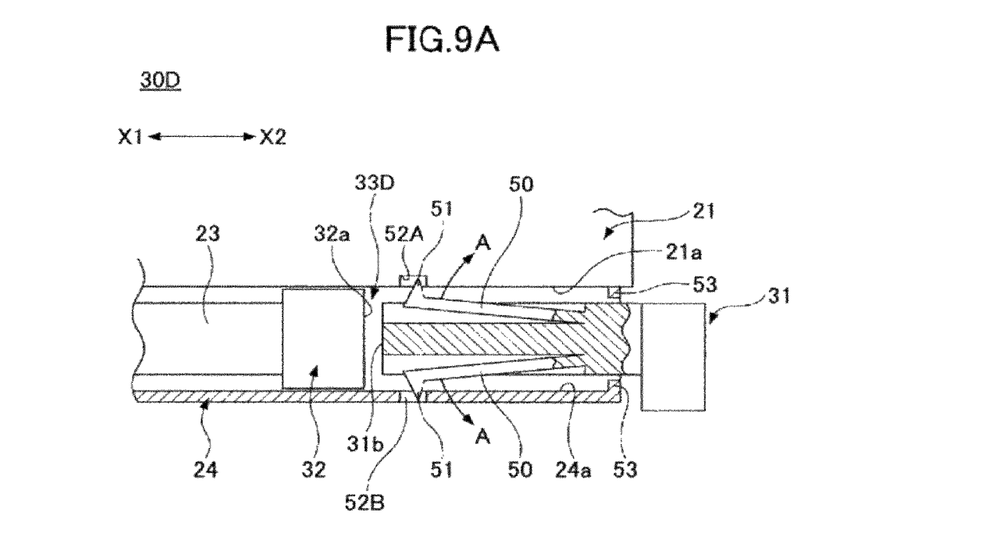
FIG. 9A is a cross-sectional view illustrating a pressed state of a button operations part of a button device of a fourth embodiment.
Figure 9B:
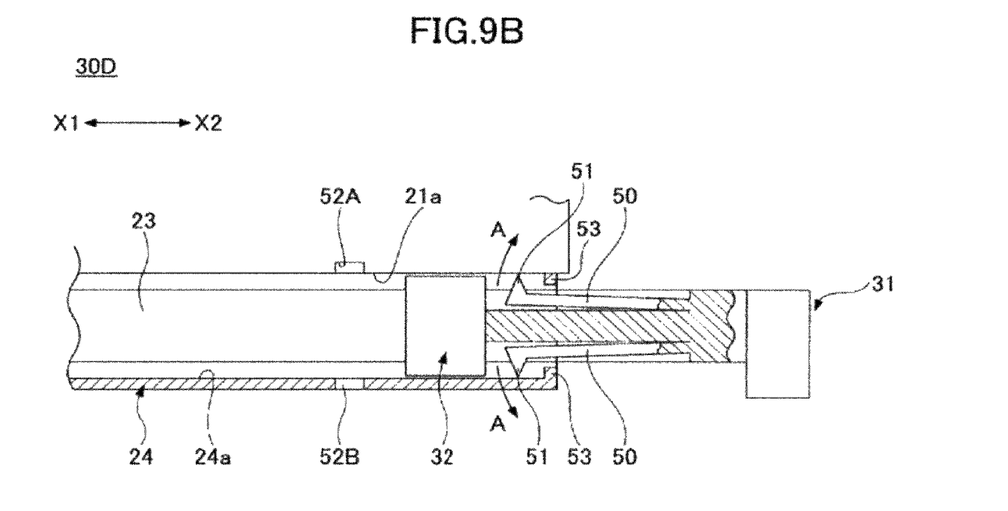
FIG. 9B is a cross-sectional view illustrating a projecting state of the button operations part of the button device of a fourth embodiment.

FIG. 9A through FIG. 9C show a button device 30D of the third embodiment. In FIG. 9A through FIG. 9C, parts that are the same as the parts shown in FIG. 1 through FIG. 6 are given the same reference numerals, and explanation thereof is omitted. Since the button device 30A of the first embodiment is provided at the card connector 20 illustrated in FIG. 4, an illustration of the card connector 20 is omitted in FIG. 9A through FIG. 9C.

As illustrated in FIG. 9A and FIG. 9B, the button device 30D of this embodiment includes the button operations part 31, the button base part 32, and a connecting part 33D. The connecting part 33D includes an end part 31b, an end part 32a, latch arms 50, an engaging concave part 52A and an engaging hole 52B (corresponding to a first engaging part of claim 7), a brim part (corresponding to a second engaging part of claim 7), and others. The end part 31b is situated at a side of the direction indicated by the arrow X1 of the button operations part 31. The end part 32a is situated at a side of the direction indicated by the arrow X2 of the button base part 32. The latch arms 50 are formed in the button operations part 31.

The connecting part 33D of this embodiment does not have the structure where the button operations part 31 and the button base part 32 are connected to each other. In this embodiment, the end part 31b and the end part 32a come in contact with each other so that the button operations part 31 and the button base part 32 are connected to (make contact with) each other. The button operations part 31 is a resin molded article. The latch arms 50 are formed on upper and lower side surfaces of the button operations part 31 in a body.

The latch arms 50 are formed on the button operations part 31 as cantilevers. Claw parts 51 are formed at the head end parts of the latch arms 50. The latch arms 50 can be elastically deformed in the directions indicated by the arrows A in FIG. 9. These elastic forces are applied so that the latch arms 50 are biased toward outsides.

The button operations part 31 can be moved in the directions indicated by the arrow X1 and X2 between a wall part 21a of the connector main body 21 and an internal wall 24a of the cover 24. At the time when the button operations part 31 moves, the claw parts 51 slide on the wall part 21a of the connector main body 21 and the internal wall 24a of the cover 24 due to the elastic force of the latch arms 50. Accordingly, while the button operations part 31 is guided by the wall part 21a and the internal wall 24a, the button operations part 31 moves. Therefore, even if the button operations part 31 is not directly connected to the button base part 32, it is possible to stably move the button operations part 31.

The engaging concave part 52A is formed in the wall part 21a. The engaging hole 52B is formed in the wall part 24a. The engaging concave part 52A and the engaging hole 52B are formed so as to correspond to the positions of the corresponding claw parts 51 when the button operations part 31 is pressed farther inside the cover 24 of the card connector 20 at the time when the IC card 18 is ejected.

Accordingly, when the button operations part 31 is pressed, the button operations part 31 moves in the direction indicated by the arrow X1 so that the end part 31b comes in contact with the end part 32a. Therefore, the button base part 32 is moved and biased in the direction indicated by the arrow X1. When the button operations part 31 moves to a designated position where the IC card 18 is ejected, the IC card 18 is ejected from the card connector 20 by the mechanism part 23 and the claw parts 51 are engaged with the engaging concave part 52A and the engaging hole 52B. As a result of this, the button operations part 31 is held stationary after being moved in the direction indicated by the arrow X1 (pressed state).

On the other hand, the brim part 53 is formed in a body with the cover 24. The brim part 53 is engaged with the claw parts 51 when the button operations part 31 is in the button projecting state. When the button operations part 31 is in the button projecting state, the button base part 32 is biased by the mechanism part 23 in the direction indicated by the arrow X2. Accordingly, the claw parts 51 are engaged with the brim part 53 due to the biasing force so that the removal of the button operations part 31 from the cover 24 is prevented. Hence, the button operations part 31 is held in the button projecting state.

Next, an operation is discussed in a case where the external force beyond assumption is applied at the time of the button projection state of the button device 30D of this embodiment.

In the button device 30D of this embodiment, when the claw parts 51 are engaged with the brim part 53, the button operations part 31 is held in the button projecting state. The engaging force for the claw parts 51 engaging the brim part 53 is set so that the claw parts 51 are not removed from the brim part 53 in a normal use (where the external force beyond assumption is not applied). The engaging force can be controlled by the elastic force of the latch arms 50, the configuration of the claw parts 51, or the like.

In a case where the external force beyond assumption is applied, the claw parts 51 are removed from the brim part 53 so that the pressing operation on the button base part 32 by the button operations part 31 cannot be performed. As a result of this, the connection between the button operations part 31 and the button base part 32 is substantially broken. At this time, the latch arms 50 are elastically deformed. When the external force beyond assumption is large, a part of the latch arms 50 and the claw parts 51 may be broken.

However, the metal brim part 53 has mechanical strength higher than those of the latch arms 50 and the claw parts 51. Accordingly, when the claw parts 51 are removed from the brim part 53, the brim part 53 and the button base part 32 may not be broken. Because of this, even if the external force beyond assumption is applied so that the connection between the button base part 32 and the button operations part 31 is broken, the button device 30D can be repaired by exchanging only the button operations part 31. Hence, it is possible to decrease the number of steps required for maintenance and reduce the cost.

According to the above-discussed embodiments, it is possible to prevent the button base part from being broken even if the external force equal to or greater than the strength of the button base part is applied. Hence, it is possible to easily perform the maintenance operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

For example, although the card connector 20 is used with an electronic device where the button devices 30A through 30D are applied in the above-discussed embodiments, a wide variety of other device can be used as long as the button operations part of the button device projects from the mechanism part (housing of the electronic device) depending on the way of use.

What is claimed is:

1. A button device, comprising:
a button operations part;
a button base part connected to a mechanism part, the mechanism part being operated by operating the button operations part; and
a connecting part configured to connect the button base part and the button operations part to each other at least based on the operation of the button operations part,
wherein the connecting part includes a cylindrical projecting part extending from said button operations part and fitting into a hole formed in said button base part, the projecting part including a fragile part having a cross-sectional area smaller than other portions of the cylindrical connection member so that the fragile part is broken or modified earlier than other portions of the connecting part in a case where the external force equal to or greater than the strength of the button base part is applied to the button operations part.

2. The button device as claimed in claim 1,
wherein the button operations part is a resin molded article; and
the projection part and the fragile part are formed in a body with the button operations part.

3. An electronic device, comprising:
the button device as claimed in claim 1.

4. A button device, comprising:
a button operations part;
a button base part connected to a mechanism part, the mechanism part being operated by operating the button operations part; and
a connecting part configured to connect the button base part and the button operations part to each other at least based on the operation of the button operations part,
wherein the connecting part includes a mechanism configured to break connection between the button operations part and the button base part in a case where an external force equal to or greater than strength of the button base part is applied to the button operations part,
wherein the connecting part includes
a metal plate fixed to the button operations part, and
an engaging groove formed in the button base part and configured to be engaged with the metal plate; and
the metal plate is configured to be broken or modified earlier than other portions of the connecting part in a case where the external force equal to or greater than the strength of the button base part is applied to the button operations part.

5. The button device as claimed in claim 4,
wherein a projecting convex part is formed on the metal plate and the engaging groove has a cross-shaped configuration;
the metal plate is engaged with a groove part forming the cross-shaped groove; and
the convex part is engaged with another groove part forming the cross-shaped groove.

6. A button device, comprising:
a button operations part;
a button base part connected to a mechanism part, the mechanism part being operated by operating the button operations part; and
a connecting part configured to connect the button base part and the button operations part to each other at least based on the operation of the button operations part,
wherein the connecting part includes a mechanism configured to break connection between the button operations part and the button base part in a case where an external force equal to or greater than strength of the button base part is applied to the button operations part,
wherein the connecting part includes
a pillar part projecting from the button base part, the pillar part having a cone configuration, and
an installing part formed in the button operations part, the installing part being where the pillar part is installed; and
the installing part includes a hole receiving the pillar part and a groove formed around the hole so that the installing part is broken or modified earlier than other portions of the connecting part in a case where the external force equal to or greater than the strength of the button base part is applied to the button operations part.

7. A button device, comprising:
a button operations part;
a button base part connected to a mechanism part, the mechanism part being operated by operating the button operations part, the button base part being movable in a concave part defined by an inner wall of a cover; and
a connecting part provided in the concave part defined by the inner wall of the cover and configured to connect the button base part and the button operations part to each other at least based on the operation of the button operations part,
wherein the connecting part includes a mechanism configured to break connection between the button operations part and the button base part in a case where an external force equal to or greater than strength of the button base part is applied to the button operations part,
wherein the connecting part includes
an engaging arm formed on the button operations part as a cantilever, the engaging arm having a head end part where a claw part is formed, the engaging arm having elasticity,
a first engaging part formed on the inner wall of the cover and configured to, by being engaged with the claw part, hold the button operations part in a pressed state, and a second engaging part formed on the inner wall of the cover and configured to, by being engaging with the claw part, hold the button operations part in a state projecting from the mechanism part; and engagement between the claw part and the second engaging part is broken in a case where the external force equal to or greater than the strength of the button base part is applied to the button operations part.

* * * * *